(12) United States Patent
Matsushima

(10) Patent No.: US 7,740,095 B2
(45) Date of Patent: Jun. 22, 2010

(54) VEHICLE INCLUDING FRAME, SWING ARM AND SIDE-SUPPORTED DAMPER

(75) Inventor: Eiji Matsushima, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 189 days.

(21) Appl. No.: 11/956,285

(22) Filed: Dec. 13, 2007

(65) Prior Publication Data

US 2008/0142288 A1 Jun. 19, 2008

(30) Foreign Application Priority Data

Dec. 19, 2006 (JP) ............................. 2006-341423

(51) Int. Cl.
B62K 25/20 (2006.01)
B60K 13/02 (2006.01)
B62J 35/00 (2006.01)

(52) U.S. Cl. .................... 180/227; 180/68.3; 280/835

(58) Field of Classification Search ................ 280/227, 280/68.3, 833, 835; 180/219, 227, 68.3; 188/321.11, 322.19

See application file for complete search history.

(56) References Cited

U.S. PATENT DOCUMENTS

| 4,402,379 | A | * | 9/1983 | Hoshi | 180/225 |
| 4,465,156 | A | * | 8/1984 | Richardson et al. | 180/227 |
| 4,508,189 | A | * | 4/1985 | Kato | 180/219 |
| 4,515,236 | A | * | 5/1985 | Kanamori | 180/227 |
| 4,653,762 | A | * | 3/1987 | Nakamura et al. | 280/835 |
| 4,694,924 | A | * | 9/1987 | Asakura et al. | 180/68.3 |
| 4,799,569 | A | * | 1/1989 | Hattori et al. | 180/219 |
| 6,325,169 | B1 | * | 12/2001 | Tateshima et al. | 180/219 |
| 6,527,289 | B2 | * | 3/2003 | Parigian | 280/284 |
| 2002/0189878 | A1 | * | 12/2002 | Iimuro | 180/219 |
| 2006/0151226 | A1 | * | 7/2006 | Misaki et al. | 180/227 |
| 2007/0175691 | A1 | * | 8/2007 | Gogo et al. | 180/227 |

FOREIGN PATENT DOCUMENTS

| DE | 3816836 | A1 | | 11/1989 |
| EP | 1462352 | A1 | | 9/2004 |
| GB | 2142591 | A | | 1/1985 |
| JP | 56132418 | A | * | 10/1981 |
| JP | 01237275 | A | * | 9/1989 |
| JP | 01311972 | A | * | 12/1989 |
| JP | 01314681 | A | * | 12/1989 |
| JP | 03042390 | A | * | 2/1991 |
| JP | 03121987 | A | * | 5/1991 |
| JP | 03176218 | A | * | 7/1991 |
| JP | 03253483 | A | * | 11/1991 |
| JP | 05-139358 | | | 6/1993 |

OTHER PUBLICATIONS

European Search Report for corresponding European application 070241563.7.

* cited by examiner

Primary Examiner—Lesley Morris
Assistant Examiner—Wesley Potter
(74) Attorney, Agent, or Firm—Rabin & Berdo, PC

(57) ABSTRACT

A motorcycle includes rear side frame portions disposed rearward of an engine and swing arms that swing relative to the rear side frame portions 11A. An oil damper provides damping force to the swing arm and extends in a vertical direction. The rear side frame portions have damper supporting sections that support lateral sides of the oil damper.

10 Claims, 5 Drawing Sheets

VEHICLE INCLUDING FRAME, SWING ARM AND SIDE-SUPPORTED DAMPER

RELATED APPLICATIONS

This application claims the benefit of priority under 35 USC 119 of Japanese patent application no. 2006-341423, filed on Dec. 19, 2006, which application is hereby incorporated by reference in its entirety.

BACKGROUND OF THE INVENTION

1. Field of the Invention

The present invention relates to a vehicle such as a motorcycle.

2. Description of Related Art

Conventionally, a vehicle such as a motorcycle described in JP-A-Hei 5-139358 has a main frame extending rearward from a head pipe and above an engine, seat rails extending generally horizontally rearward from a mid portion of the main frame, and a swing arm coupled with a rear end of the main frame for swing movement with a rear wheel attached thereto. An oil damper is disposed between the seat rails and the swing arm. The damper extends and contracts when the swing arm swings by vibrations and shocks transmitted from the road while running; thereby, the damper damps the swing movement of the swing arm to enhance the ride of the vehicle.

In JP-A-Hei 5-139358, a bracket disposed at a top end of a cylinder of the oil damper is attached to the seat rails positioned in a top portion of the vehicle. Because the seat rails are located in a high position, the center of gravity of the whole vehicle is placed at a high position, and there arises a problem in that it is difficult to sufficiently improve the running stability of the vehicle.

SUMMARY OF THE INVENTION

The present invention is made in view of this problem and provides a vehicle with improved running stability.

A vehicle according to the present invention includes an engine, a rear side frame disposed rearward of the engine, and a swing arm that swings relative to the rear side frame. A damper is supported by the rear side frame and the swing arm and provides damping force to the swing arm. The damper extends in a vertical direction, and the rear side frame has a damper supporting section that supports a lateral side of the damper.

According to the present invention, because the damper supporting section of the rear side frame supports the lateral side of the damper extending in the vertical direction, the center of gravity of the vehicle is lowered and the running stability of the vehicle is improved. The damper is only required to extend substantially in the vertical direction and may be inclined forward or rearward.

In one embodiment, the damper has an attaching bracket that projects sideward from an outer surface of the damper and is attached to the damper supporting section. In comparison to a configuration in which the damper supporting section is attached to the damper cylinder itself, support of the damper by the damper supporting section is more easily provided by this embodiment.

The damper supporting section may include a left side damper supporting section on a left side of the damper and a right side damper supporting section on a right side of the damper, and the attaching bracket may include a left side attaching bracket attached to the left side damper supporting section and a right side attaching bracket attached to a right side damper supporting section. Thereby, the damper is more surely supported.

The attaching bracket may be supported by the damper supporting section for pivotal movement. The damper cylinder can thereby incline relative to the rear side frame, and the swing arm can smoothly swing in a running state of the vehicle.

In another embodiment, a fuel tank is disposed above the engine. The fuel tank extends rearward and has an upper position section positioned above a top end of the damper. The capacity of the fuel tank is thereby increased.

The fuel tank may have a side position section positioned on a lateral side of the top end of the damper to further increase the capacity of the fuel tank.

In another embodiment, an air cleaner is disposed rearward of the damper, and an intake conduit is connected to the air cleaner and to the engine positioned in front of the damper. The intake conduit can extend on a lateral side of the damper to be connected to the engine, thereby effectively using a space around a top portion of the damper.

Alternatively, the intake conduit can extend above a top end of the damper to be connected to the engine, thereby allowing the intake conduit to be thicker and increasing an amount of air flowing through the intake conduit.

In this embodiment, the intake conduit may have an upper position section positioned above a top end of the damper.

According to the present invention, the center of gravity of the vehicle is lowered, and the running stability is enhanced.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
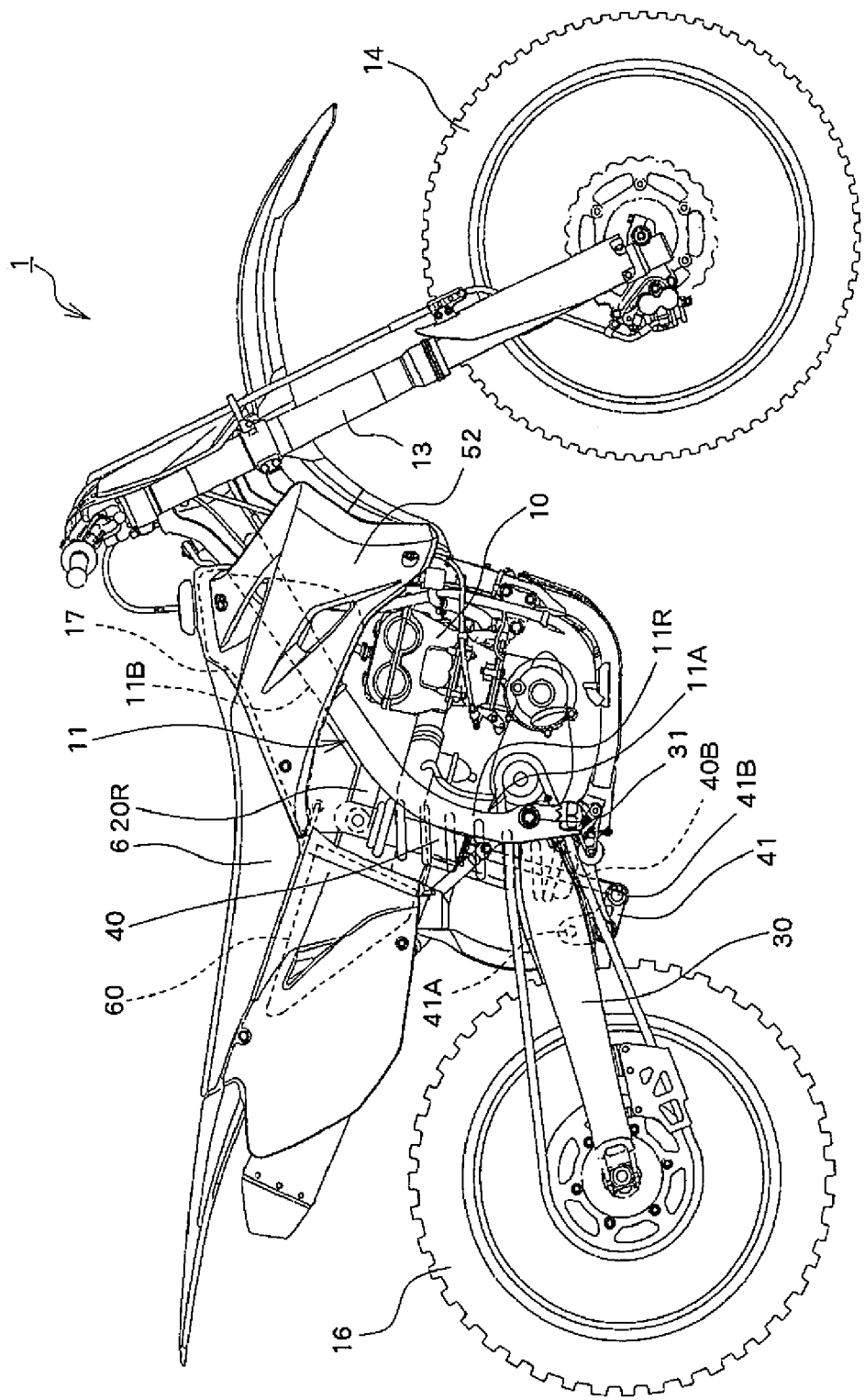
FIG. 1 is a side view of a motorcycle according to a first embodiment of the present invention.
Figure 2:
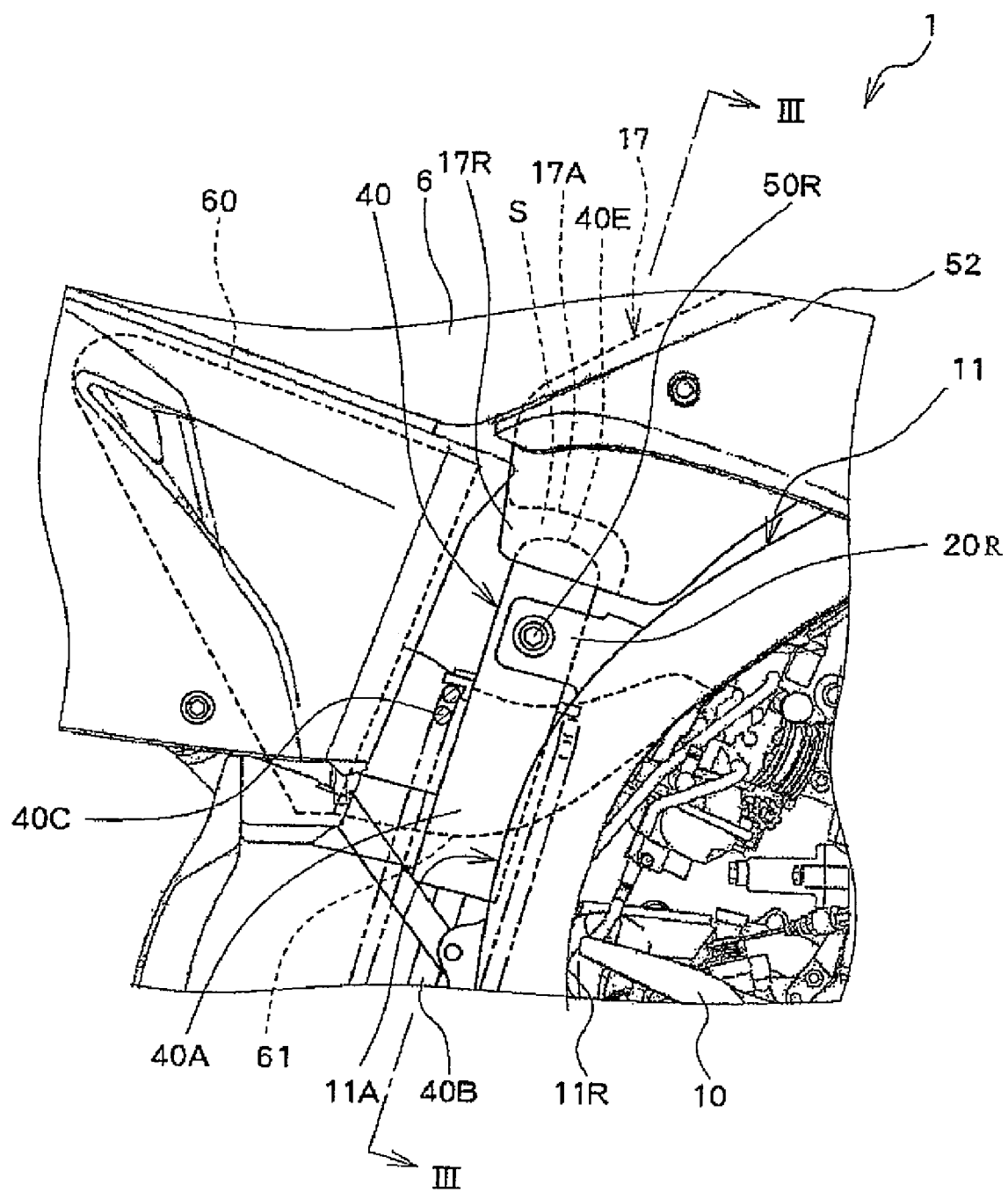
FIG. 2 is a partial, enlarged view of a rear side frame portion and oil damper of the motorcycle of FIG. 1.
Figure 3:
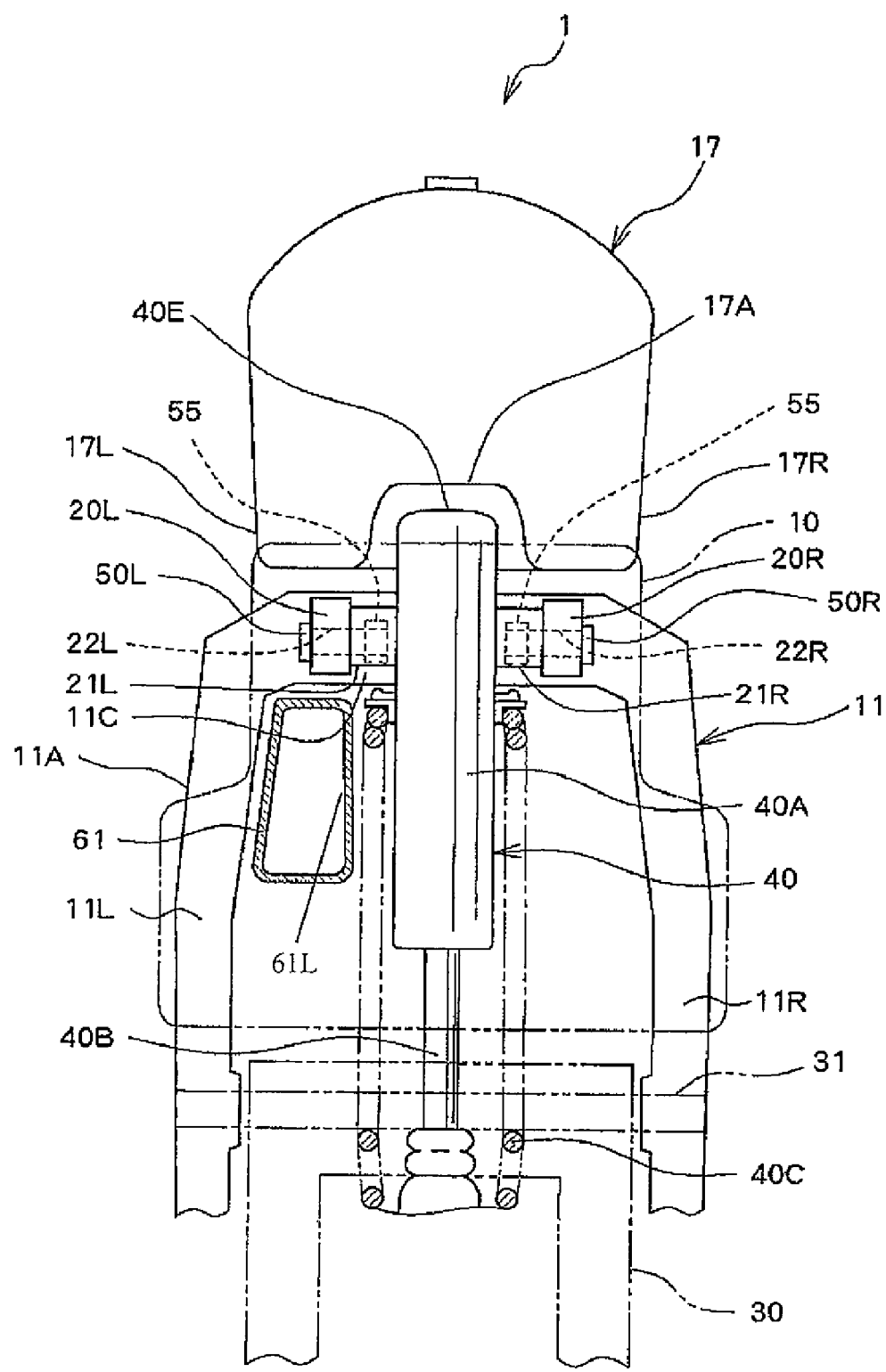
FIG. 3 is a cross sectional view taken through line III-III of FIG. 2.

A vehicle configured in accordance with a first embodiment of the present invention is described with reference to FIGS. 1-3. As shown in FIGS. 1-3, a motorcycle 1 has an engine 1, left and right main frames 11, a front wheel 14, a rear wheel 16, left and right swing arms 30 (only one of them is shown), an oil damper 40 and an air cleaner 60. Front wheel 14 is attached to a right and left pair of front forks 13 (only one of them is shown) for swing movement in a vertical direction and to be steered. Swing arms 30 extend rearward and support rear wheel 16 for rotation. The front ends of swing arms 30 are attached to main frames 11 through a pivot shaft 31 so that swing arms 30 and rear wheel 16 can swing vertically relative to main frames 11. A fuel tank 17 is mounted above engine 10, and a seat 6 is disposed behind fuel tank 17. An air cleaner 60 is disposed below a rear portion of seat 6.

Each main frame 11 includes a rear side frame portion 11A positioned behind engine 10 and a front frame portion 11B extending from the front (top) end of rear side frame portion 11A and obliquely upward and forward above engine 10. Rear side frame portions 11A include left side frame section 11L, right side frame section 11R and a reinforcing frame section 11C. Frame sections 11L and 11R extend vertically behind engine 10 and slightly curve arcuately from a bottom (rear) end toward a top (front) end. Reinforcing frame section 11C extends in a vehicle width direction between and couples the front (top) ends of frame sections 11L and 11R (FIG. 3).

Each rear side frame portion 11A has a left side damper supporting section 20L and a right side damper supporting section 20R for supporting oil damper 40. Damper supporting sections 20L and 20R extend rearward from left and right ends of reinforcing frame section 11C. Damper supporting sections 20L and 20R are made of a plate material that generally has a rectangular shape and have bolt holes 22L, 22R formed at ends thereof. Left and right side attaching brackets 21L and 21R of the oil damper are attached to bolt holes 22L, 22R by bolts 50L, 50R.

As shown in FIG. 3, oil damper 40 extends vertically between frame sections 11L and 11R. Oil damper 40 includes a cylinder 40A, a rod 40B, a coil spring 40C and a piston (not shown). Cylinder 40A is supported by rear side frame portions 11A and contains oil. The piston is disposed for slide movement inside cylinder 40A. The base end of rod 40B is fixed to the piston, while its tip end extends outside of cylinder 40A and is supported by swing arms 30. Coil spring 40C is disposed between cylinder 40A and rod 40B for extending and contracting movement.

Left and right side attaching brackets 21L and 21R are positioned midway in an axial direction of cylinder 40A. Brackets 21L and 21R have a columnar shape and project leftward and rightward from an outer surface of cylinder 40A. Brackets 21L and 21R are coupled with damper supporting sections 20L and 20R by bolts 50L and 50R for pivotal movement. Bearings 55, 55 are put on bolts 50L, 50R. Brackets 21L and 21R are thereby pivotable relative to damper supporting sections 20L and 20R.

As shown in FIG. 1, the tip end of rod 40B of oil damper 40 is attached to swing arms 30 through a link member 41. The tip end of rod 40B is pivotable relative to link member 41. Link member 41 is made of a plate material and curves generally in a shape of the letter L. One end 41A of link member 41 is coupled with swing arms 30 for pivotal movement, and the other end 41B is coupled with rod 40B of oil damper 40 through a bearing for pivotal movement.

When rod 40B enters cylinder 40A because swing arms 30 swing upward while running, oil contained inside cylinder 40A passes through orifices defined in the piston. The oil damper thereby provides a damping (attenuation) force to swing arms 30.

Fuel tank 17 is shaped as a casing and is disposed above engine 10. A cover 52 circumferentially surrounds an outer surface of fuel tank 17. Fuel tank 17 extends rearward and has an upper position section 17A positioned above a top end 40E of oil damper 40. Upper position section 17A is positioned in a space S defined between top end 40E of oil damper 40 and cover 52 (FIG. 2). Side position sections 17L, 17R of fuel tank 17 are positioned on left and right sides of oil damper 40 and above reinforcing frame section 11C (FIG. 3). The capacity of fuel tank 17 is thereby ensured while interference between fuel tank 17 and top end 40E of oil damper 40 is avoided.

Air cleaner 60 is disposed behind oil damper 40. An intake conduit 61 for supplying air cleaned by air cleaner 60 to engine 10 is connected to cleaner 60. As shown in FIG. 3, intake conduit 61 extends on the left side of oil damper 40 and is connected to engine 10 positioned in front of oil damper 40. Intake conduit 61 has a side position section 61L positioned on a lateral side of oil damper 40 and on a right side (closer to vehicle center in the width direction) of left side frame section 11L.

In motorcycle 1, left and right side attaching brackets 21L and 21R projecting leftward and rightward are disposed on the outer surface of cylinder 40A of oil damper 40. Brackets 21L, 21R are supported by left and right side damper supporting sections 20L and 20R of rear side frame portions 11A. Therefore, main frames 11 and the seat rails supporting seat 6 are not required to be positioned above the oil damper to support oil damper 40. The center of gravity of the vehicle body can thereby be lowered and the running stability of the vehicle is enhanced.

Figure 4:
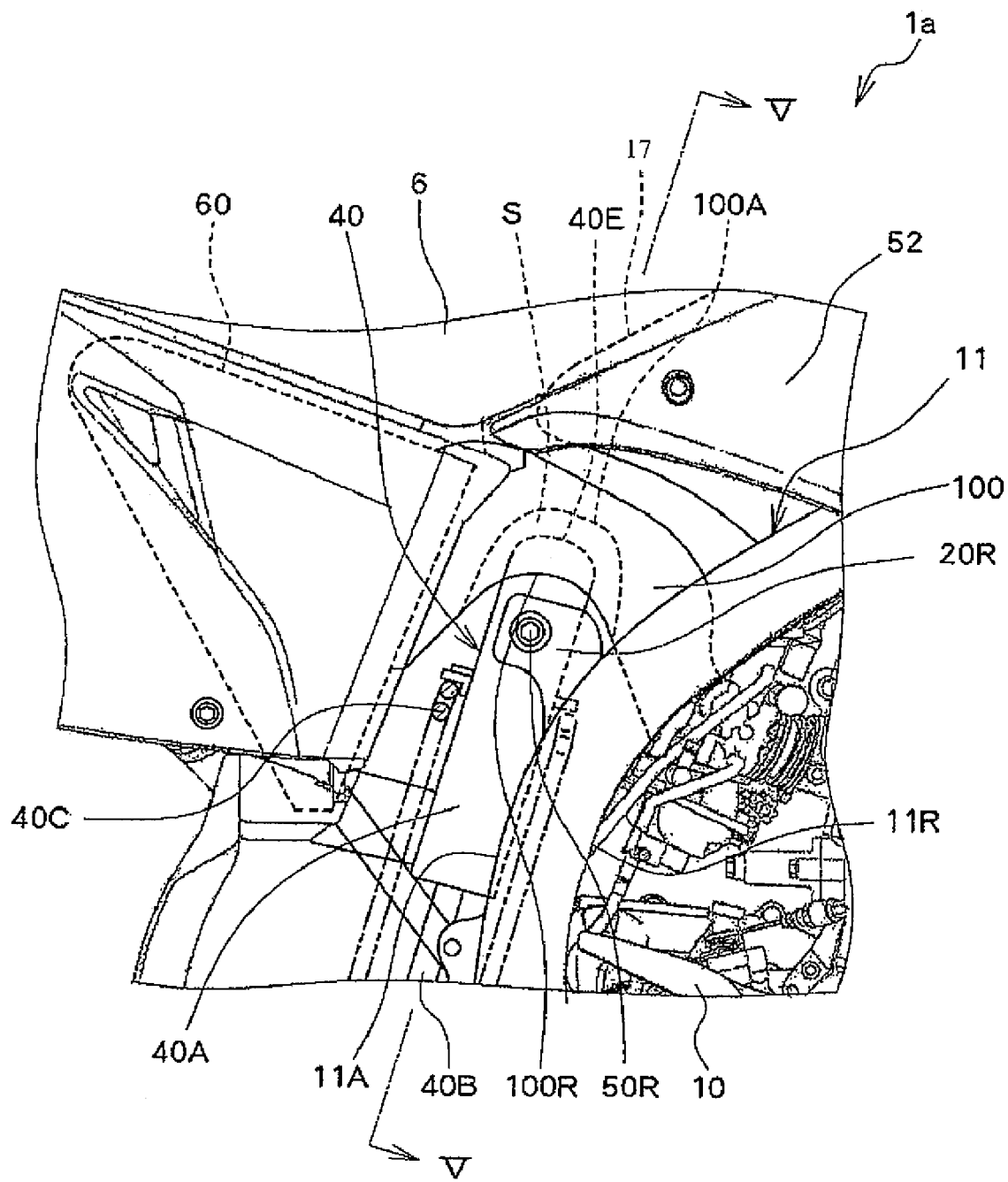
FIG. 4 is a partial, enlarged view of a rear side frame portion and oil damper according to a second embodiment of the present invention.
Figure 5:
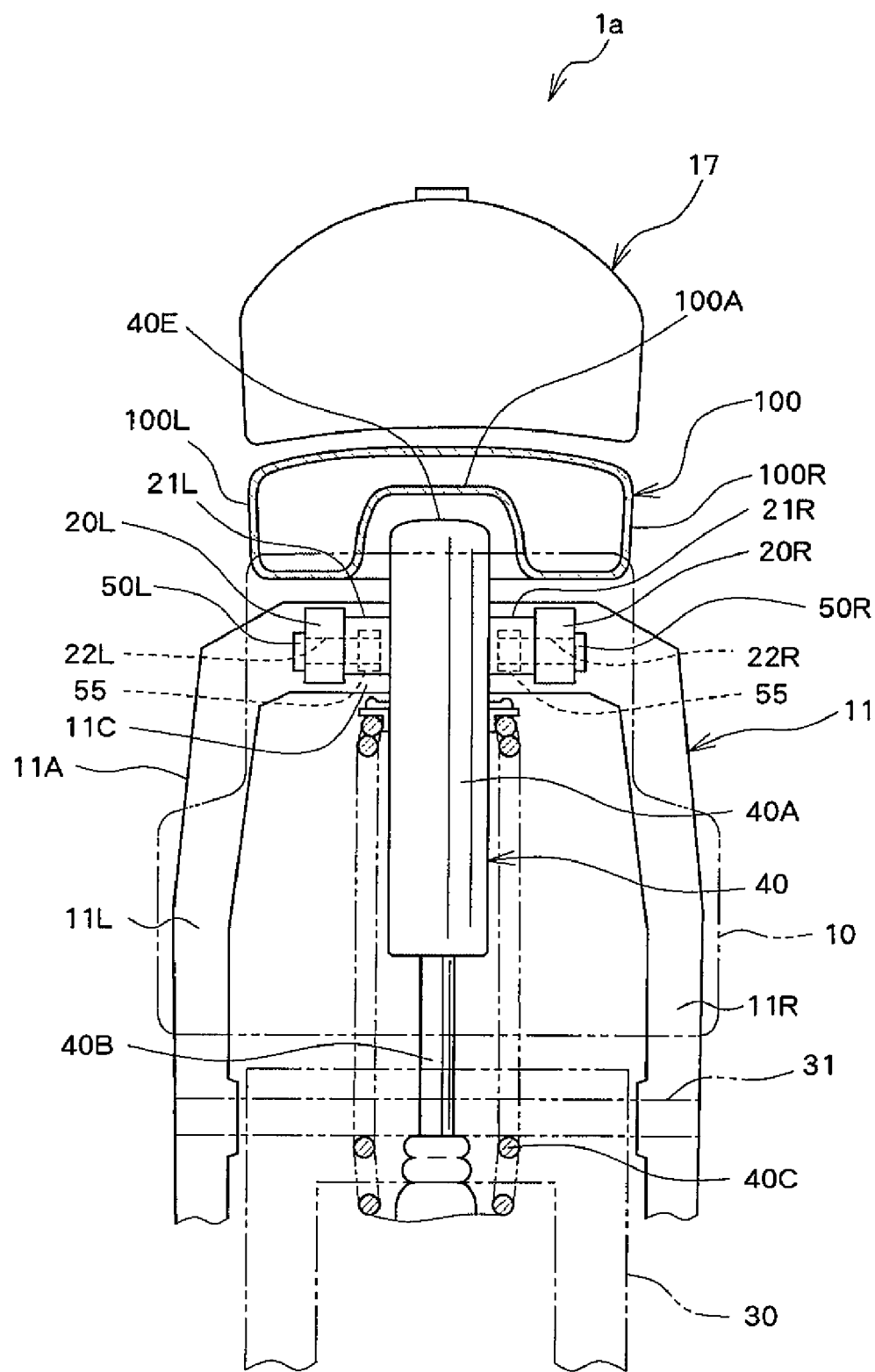
FIG. 5 is a cross sectional view taken through line V-V of FIG. 4.

The present invention may be modified and is not limited to the above-described embodiment. For example, although fuel tank 17 is disposed above oil damper 40, the intake conduit can be disposed above oil damper 40. Motorcycle 1a of FIGS. 4 and 5 is modified in such a manner. In FIGS. 4 and 5, portions that are the same as portions described above are assigned the same reference numerals and repeat descriptions are omitted.

In motorcycle 1a, an intake conduit 100 extends above top end 40E of oil damper 40 and is connected to engine 10 positioned in front of oil damper 40. Intake conduit 100 has an upper position section 100A positioned above top end 40E of oil damper 40. Upper position section 100A is positioned in a space S defined between top end 40E of oil damper 40 and cover 52 in a side view. Also, as shown in FIG. 5, intake conduit 100 has side position sections 100L, 100R positioned on left and right sides of oil damper 40 and above reinforcing frame section 11C. Thereby, intake conduit 100 is thicker and the amount of air flowing through intake conduit 100 can increase, while interference between intake conduit 100 and oil damper 40 is avoided. Other devices of motorcycle 1a can be placed in spaces defined on left and right sides of a mid portion of oil damper 40 to effectively use those spaces.

Motorcycle 1 has been described as an example of a vehicle according to the invention. The present invention is not limited to a motorcycle, however, and can be applied to other vehicles such as three-wheeled vehicles and beach buggies.

The particular embodiments of the invention described in this document should be considered illustrative, rather than restrictive. Modification to the described embodiments may be made without departing from the spirit of the invention as defined by the following claims.

The invention claimed is:

1. A vehicle comprising:
an engine;
a rear side frame disposed rearward of the engine;
a swing arm that swings relative to the rear side frame; and
a damper supported by the rear side frame and the swing arm and providing a damping force to the swing arm, wherein
the damper extends in a vertical direction, and
the rear side frame has a damper supporting section that supports a lateral side of the damper, wherein
the damper comprises a cylinder and a rod that is extendable beyond a bottom end of the cylinder; and
the damper supporting section of the rear side frame connects to an attaching bracket that projects sideward from an outer surface of the damper between a top end of the damper and a bottom end of the damper in a vertical direction, and wherein the top end of the damper is positioned above the lateral side of the damper that is supported by the damper supporting section of the rear side frame.

2. The vehicle according to claim 1, wherein the damper supporting section comprises a left side damper supporting section on a left side of the damper and a right side damper supporting section on a right side of the damper.

3. The vehicle according to claim 2, wherein the attaching bracket comprises a left side attaching bracket attached to the left side damper supporting section and a right side attaching bracket attached to a right side damper supporting section.

4. The vehicle according to claim 1, wherein the attaching bracket is supported by the damper supporting section for pivotal movement.

5. The vehicle according to claim 1 further comprising: a fuel tank disposed above the engine, wherein the fuel tank extends rearward and has an upper position section positioned above the top end of the damper.

6. The vehicle according to claim 5, wherein the fuel tank has a side position section positioned on a lateral side of the top end of the damper.

7. The vehicle according to claim 5 further comprising: an air cleaner disposed rearward of the damper; and an intake conduit connected to the air cleaner and to the engine positioned in front of the damper, wherein the intake conduit extends on a lateral side of the damper to be connected to the engine.

8. The vehicle according to claim 1 further comprising: an air cleaner disposed rearward of the damper; and an intake conduit connected to the air cleaner and to the engine positioned in front of the damper, wherein the intake conduit extends above a top end of the damper to be connected to the engine.

9. The vehicle according to claim 8, wherein the intake conduit has an upper position section positioned above a top end of the damper.

10. The vehicle according to claim 1, wherein the vehicle is a motorcycle.

* * * * *